Feb. 14, 1939.　　R. N. STODDARD　　2,147,468
AUTOMATIC RELEASE WELDING CIRCUITS
Filed Oct. 9, 1937
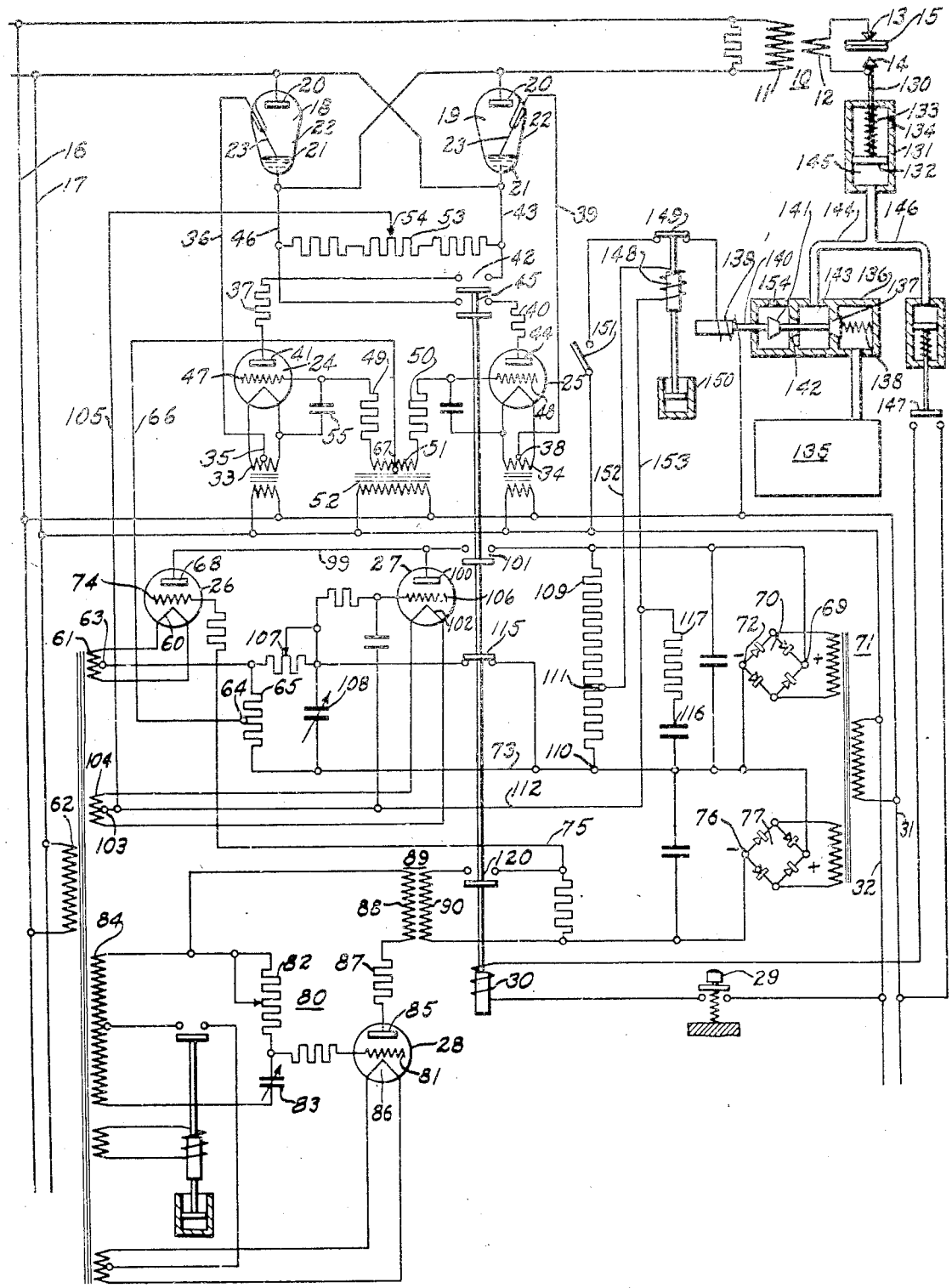
WITNESSES:
Leon M. Garman
R. W. Bailey
INVENTOR
Ralph N. Stoddard.
BY
F. W. Lyle.
ATTORNEY Patented Feb. 14, 1939

2,147,468

UNITED STATES PATENT OFFICE 2,147,468

AUTOMATIC RELEASE WELDING CIRCUITS

Ralph N. Stoddard, Pittsburgh, Pa., assignor to Westinghouse Electric & Manufacturing Company, East Pittsburgh, Pa., a corporation of Pennsylvania Application October 9, 1937, Serial No. 168,208

1 Claim. (Cl. 219—4)

My invention relates to welding circuits, and especially to welding circuits in which a discharge device is inserted to pass the welding current therethrough.

An object of the invention is to automatically release the application of the welding electrodes from the parts being welded upon completion of a predetermined number of half cycles of welding current.

Another object of my invention is to provide automatic means for controlling both the application of the welding current and the welding electrodes to the work.

At the present time, welders apply the electrodes to the work and when they judge the work has been completed, the electrodes are withdrawn and applied to the next work to be welded. In assembly lines of present day mass producing manufacturing establishments, it is apparent that the exact number of half cycles of welding current can be predetermined that will do the welding job exactly because one job will be exactly like the next waiting in line. In such an assembly line the expenditure of extra half cycles of welding current and the extra time taken by the workmen in performing the welding operation over that necessary to complete the weld will be multiplied by the large number of units which the workmen will weld in a day and will amount to a large amount of unnecessary expenditure of electricity and time. It is, accordingly, an object of my invention to provide automatic means by which the welding current will be applied for the necessary number of half cycles of welding current, and at the conclusion of these necessary half cycles of welding to the work, at least one of the electrodes will be automatically withdrawn from the work, so that the apparatus can be applied to the next job in the assembling line.

Other objects and advantages will be apparent from the following description and drawing, in which the single figure is a diagrammatic view illustrating a preferred embodiment of my invention.

Referring to the figure of the drawing, the reference character 10 designates generally a welding transformer having a primary winding 11 and a secondary winding 12. The secondary winding 12 is connected to the customary welding circuit in which the welding electrodes 13, 14 are diagrammatically represented applied to objects 15 which are to be welded together. The primary winding 11 of the transformer is connected by means of conductors 16 and 17 to a source of alternating current.

In order to control the application of the welding current from the source of alternating current to the transformer 10, vapor electric devices shown generally at 18 and 19 are provided. The devices 18 and 19 are of the mercury vapor type having an anode 20 and a mercury pool 21 as a cathode in the bottom of a container 22. In order to render the vapor electric devices 18 and 19 conducting, a starting electrode 23 is provided.

Although other types of starting electrodes may be utilized, I prefer to use a high resistance electrode immersed in the mercury and composed of carborundum or boron carbide. This type of starting electrode is well known in the art and is more specifically described in Patent No. 2,069,283, issued February 2, 1937, to Joseph Slepian.

The two devices 18 and 19 are disclosed in order that both directions of the alternating current may be controlled in the application to the welding circuit, since each device acts as a rectifier as well as being a controllable conductor.

When a certain amount of current is caused to flow through the starting electrode 23 into the mercury pool 21, a cathode spot is formed which furnishes a source of electrons which in turn causes ionization of the mercury vapor within the container 21 and, under the influence of positive anode potential, the tube becomes conducting. Thus, it is only necessary to pass sufficient starting current through the starting or ignition electrode 23 to form the cathode spot at a predetermined time in the proper half cycle in the alternating current wave to render the vapor electric devices conducting for the remainder of that particular half cycle. In order to conduct succeeding half cycles of alternating current, the vapor electric devices 18 and 19 are connected inversely. That is, the anode 20 of device 18 is connected to the cathode 21 of device 19, and the anode 20 of device 19 is connected to the cathode 21 of device 18. It will, therefore, be evident that if the vapor electric devices 18 and 19 are energized in turn during successive half cycles, current from the source of alternating current will flow to the transformer 10 as long as this condition is maintained.

A preferred embodiment of the automatic means for completing the application of the electrodes to the part 15 is disclosed on the drawing. It is generally advisable to attach such means only to one of the electrodes because the workmen can apply one of the electrodes to the parts and then start the apparatus to apply the other electrode thereto. Accordingly, I have disclosed only the automatic application of one of the electrodes to the work, although it is apparent that such application might be made to both electrodes if such were desired. The electrode 14 preferably has a shaft 130 extending into a casing 131, and this shaft has a plunger 132 actuated by the pressure within the casing. A spring 133 preferably surrounds the shaft to withdraw the electrode from its operative position when the pressure is released. A vent 134 provides release of atmosphere on the forward side of the plunger.

A reservoir 135 provides the pressure medium which might be compressed air or oil or any similar desired medium for conveying the pressure. This air reservoir is connected to a valve casing 136 having a valve 137 under pressure of a spring 138, normally maintaining the valve closed. The valve may be opened by a relay 139 actuating a shaft 140 connected to the valve 137. When the shaft is actuated, a valve 141 closes the opening 142 and the medium under pressure passes from the reservoir or pump 135 through a chamber 143 and conduit 144 to the portion 145 of the casing 131, and presses the welding electrode 14 in contact with the object or objects 15 to be welded.

A conduit 146 is also preferably connected to the conduit 144 to operate a switch 147 for actuating the control system of the welding current at the time that the electrode is applied to the work. Upon completion of the desired number of half cycles of welding current, the relay 148 will be operated by the control system to break the current at switch 149 and release the pressure on the electrode 14 and the switch 147 to interrupt the control circuit. If it is desired to make any slight time delay or lag in releasing the electrode or the switch 147, damping means 150 may be applied to the relay 148. The switch 151 actuates the application of the current from 16 and 17 to the relay 139, actuating the pressure means.

While various control systems might be devised for the automatic application of the current to the electrode and the application of the electrode to the work, I prefer to modify the system disclosed in the copending application of John W. Dawson, Serial No. 142,564, for Welding timing circuits, filed May 14, 1937.

The control system involves the utilization of control tubes for supplying ignition current to control the discharge in the tubes 18 and 19 and also electronic devices for accurately operating and stopping the operation of these tubes at predetermined points on the half cycles of alternating current. In the preferred embodiment illustrated, I utilize tubes 24 and 25 for controlling the discharge in the devices 18 and 19 through the igniter or starter 23 and then I utilize a starting tube 26, a cut-off tube 27 for the discharge and in addition for starting the discharge at a predetermined point on the first half cycle of the power period a further tube 28. The application of this control system is preferably instituted by an externally operated switch 29 which may be operated manually or by a cam on the welding machine. In other words, when the operator desires to perform the welding operation, he depresses the switch 29, energizing the relay 30 from the conductors 31, 32 connected to the source of alternating current. The relay 30, in turn, operates various individual switches hereinafter referred to in the description of the control circuit.

The cathodes of the tubes 24 and 25 are energized from the alternating circuit by transformers 33 and 34, respectively. The midpoint of the secondary of the transformer 33, namely 35, has a connection 36 extending to the ignitor or starter 23 of tube 18. Likewise, the midpoint 38 of the secondary of transformer 34 is connected through connection 39 to the starting electrode 23 of the tube 19. The anode 41 of tube 24 is connected through resistance 37 and switch point 42 of the starting relay 30 to the connection 43 to the anode 20 of tube 18. The anode 44 of tube 25 is likewise connected through resistance 40 and switch 45 of the relay 30 to the connection 46 to the anode 20 of tube 19. The grids 47 and 48 of tubes 24 and 25 are connected through suitable resistances 49 and 50 to opposite ends of the secondary 51 of transformer 52 connected to the source of alternating current. The grids and cathodes of tubes 24 and 25 may be energized from secondary windings on the same transformer instead of the individual transformers disclosed. Between the conductors 43 and 46 extending to the cathodes and anodes of the tubes 18 and 19 previously described is a resistance 53. The variable tap 54 on this resistor is to compensate for any slight difference between the tubes 18 and 19 in operation. The further function of this resistance 53, together with the transformer winding 51, connecting the grids and cathodes of the tubes 24 and 25 is to nullify the alternating-current potential which would otherwise exist on the grids 47 and 48 of tubes 24 and 25, because of their circuit locations.

Tube 26 is utilized as a starting device. Its cathode 60 is energized through the secondary 61 of transformer 62 and the midpoint 63 of this secondary is connected through the midpoint 64 of resistance 65 and connections 66 to the midpoint 67 of the transformer secondary 51 connected to the grids 47 and 48 of the tubes 24 and 25. The anode 68 of tube 26 is connected to the positive terminal 69 of a source of direct current potential disclosed as the rectifier grid 70 which is connected to a transformer 71, energized from the source of alternating current. The negative terminal 72 is connected through conductor 73 to the resistance 65, cathode transformer secondary 61 and cathode 60. The grid 74 of tube 26 is connected through a connection 75 to the negative terminal 76 of a similar rectifier bridge 77 also energized by the alternating-current source. These rectifier bridges are preferably of the well known copper oxide dry plate type. The negative potential from the rectifier bridge 77 on the grid 74 constitutes a discharge preventing bias normally applied to the control electrode of the starting tube 26.

The operation of the starting tube 26 is controlled by means of the timing tube 28 previously referred to which controls the point of initiation of tube 26 with respect to the voltage wave. This timing tube 28 is preferably of the hot cathode gaseous discharge type and is provided with a phase shifting control circuit 80 for the grid 81 of the tube. This phase shifting control circuit comprises an adjustable resistor 82 and an adjustable capacitor 83. The phase shifting circuit 80 is connected by means of a transformer 84 to the same source of alternating current as is applied to the anode 85 and cathode 86 of the timing tube 28. Alternating current for the timing tube 28 is provided from windings on the secondary of transformer 84. The output of timing tube 28 is applied to a circuit comprising the resistor 87 and a winding 88 of a transformer 89. The secondary winding 90 of the transformer 89 is indirectly connected to the grid 74 of the starting tube 26 when the switch 120 of relay 30 is closed through the connection 75 which, as previously described, normally applies a negative discharge preventing potential to this grid 74.

The phase shifting circuit 80 is adjusted by means of the variable resistor 82, and variable capacitor 83 to render the start tube 26 conducting at the desired point in the cycle of operation of the alternating current source. The phase shifting circuit 80 will determine the exact point on the voltage wave that the tube 28 will be rendered conducting. The discharge in tube 28 permits current to flow through the primary winding 88 of transformer 89 and due to the steep wave front of the current applied, a sharp voltage surge will appear in the secondary winding 90 which will be applied, in turn, to the grid 74 of the starting tube 26. The peak value of the surge is sufficient to overcome the negative potential of the source 77 and to positively bias the grid 74, thereby rendering the start tube 26 conducting. As soon as the start tube 26 becomes conducting, a positive potential is applied to the control tubes 24 and 25 and they will then function to establish the conductivity of tubes 18 and 19.

It will be noted that the cut-off space discharge device 27 has its anode 100 connected through switch 101 to the same positive terminal of the rectifier bridge 70 as the anode 68 of the starting tube 26. The cathode 102 of the cut-off tube 27 is connected through the midpoint 103 of the transformer secondary 104 by means of a connection 105 to the midpoint 54 of the resistance 53 across the anodes and cathodes of the tubes 18 and 19. The grid 106 of cut-off tube 27 is connected through adjustable resistance 107 to the cathode circuit 60 of the starting tube 26. An adjustable timing condenser 108 is connected to the cathode circuit 63, 60 of starting tube 26 and to conductor 73 extending from the negative terminal of the direct-current rectifier bridge 70 to the resistance 65. The resistance or voltage divider 109 extends from the connection 99 between the anodes of tubes 26 and 27 to the point 110 on the conductor 73 connected to the grid 106 of tube 27. A tap 111 is taken from a point on the potentiometer and by means of connection 112 is applied to the cathode circuit 102 of the cut-off tube 27. It will be noted that the point 110 with respect to junction 111 corresponds to the negative grid potential of the cut-off tube 27. The point 111 corresponds to the cathode potential of the tube 27.

The conduction of the tube 26 will apply potential across the resistor 65 and this potential acts to charge the condenser 108 through the variable resistance 107. After a time variable by adjustment of resistor 107, condenser 108 is sufficiently charged to raise the grid 106 of tube 27 to its breakdown point with respect to its cathode 102. With the breakdown of this tube, positive potential is fed through the tube and its cathode transformer to wire 105, which action again throws the bias on control tubes 24 and 25 to a negative value stopping the further ignition of the tubes 18 and 19 and hence further welding currents after the termination of the particular half cycle. Leads 66 and 105 are the timing circuit output leads.

Whe neither tube 26 nor 27 is ignited the lead 66 is negative to lead 105. When the starting tube 26 discharges, the lead 66 becomes positive and the lead 105 becomes negative. When the stop tube ignites, the lead 66 again becomes negative in respect to the lead 105. During the period while lead 66 is positive in respect to lead 105, welding current can flow.

The weld has, accordingly, been completed by the automatic operation of tubes accurately timing the predetermined number of half cycles of alternating current. No manual operation by the operator in connection with the control circuit is necessary after the work 15 is in position, except for the depression of the manual switch 29. The sequence of the switches operated thereby is first switch 101 to complete the output circuit of rectifiers 70 and 77, then switches 45 and 42 together and then 120. After the weld has been completed, the pressure is released from switch 29 and the various switches operated by relay 30 will be released in reversed order, namely 120, 42 and 45 and then 101, but the connection at switch 115 will be made to discharge the timing condenser 108 and have it ready for the next operation.

It will be noted that both the negative component of the timing voltage applied to tube 27, i. e., between 110 and 111, and the positive component of timing voltage, i. e., the voltage across 108, is derived from the same source 70, and, accordingly, variations in this source due to changing of temperature or other causes will equally effect the positive and negative components of grid voltage as applied to tube 27 and will not change therefore the accuracy of timing following the discharge of tube 26.

Various condensers and resistances are, of course, illustrated at desired places in the apparatus, some of which, as at 116 and 117, act as filters.

The pressure means described in the first part of the description is actuated by the relay 139 whose actuating current is controlled by the relay 148. This relay 148 is inserted between the point 111 on the potentiometer 109 and its connection to the resistance 117. When the stop tube 27 is actuated by the discharge of the condenser 108, the change in current from point 111 through conductors 152 and 153 will actuate the relay 148 to open the switch 149 and withdraw the actuation of the pressure means by closing the valve 137. The release of the pressure in chamber 136, conduit 144 and chamber 145 through the vent 154 in casing 136 will permit the spring 133 to withdraw the electrode 14 from the work 15.

My invention accordingly permits the accurate application of the exact number of half cycles necessary for a welding job to be applied thereto, and the automatic withdrawal of an electrode from such work upon the completion of the application of these half cycles to the work. The saving in both electricity and time of the workmen in large and fast moving assembly lines through the utilization of my invention should be apparent. It is also obvious that the workmen do not need to be highly skilled in the work as formerly, because the apparatus can be set by one highly skilled workman and the actual work performed by another who has merely to apply one of the electrodes to the work.

It is apparent that many modifications may be made in the specific form of the pressure and control means illustrated in my preferred embodiment. Accordingly, I desire only such limitations to be placed on the following claim as are necessitated by the prior art.

I claim as my invention:

In combination, a pair of welding electrodes for application to parts to be welded, an alternating current welding circuit connected to said welding electrodes, a discharge device having a portion of said alternating current welding circuit therethrough, an electrode in said device controlling the passage of the alternating current through said device and circuit, circuit means applied to said electrode stopping the discharge therethrough after a predetermined number of half cycles, pressure means completing the application of the electrodes to the parts to be welded, said circuit means automatically releasing said pressure means upon the completion of the predetermined number of half cycles.

RALPH N. STODDARD.